US009845265B2

(12) United States Patent
Ulrike et al.

(10) Patent No.: US 9,845,265 B2
(45) Date of Patent: Dec. 19, 2017

(54) SYSTEM OF PLANT OR BIO-SOURCED MATERIALS

(71) Applicant: S. A. Lhoist Recherche et Developpement, Ottignies-Louvain-la-neuve (BE)

(72) Inventors: Peter Ulrike, Ixelles (BE); Daniel Daviller, Chattilon-le-Duc (FR)

(73) Assignee: S.A. Lhoist Recherche et Developpement, Ottignies-Louvain-la neuve (BE)

( * ) Notice: Subject to any disclaimer, the term of this patent is extended or adjusted under 35 U.S.C. 154(b) by 0 days.

(21) Appl. No.: 15/039,917

(22) PCT Filed: Dec. 3, 2014

(86) PCT No.: PCT/EP2014/076344
§ 371 (c)(1),
(2) Date: May 27, 2016

(87) PCT Pub. No.: WO2015/082513
PCT Pub. Date: Jun. 11, 2015

(65) Prior Publication Data
US 2017/0001909 A1 Jan. 5, 2017

(30) Foreign Application Priority Data
Dec. 6, 2013 (BE) .................... 2013/0818

(51) Int. Cl.
| C04B 28/10 | (2006.01) |
| C04B 20/00 | (2006.01) |
| C04B 28/02 | (2006.01) |
| C04B 14/28 | (2006.01) |
| C04B 24/08 | (2006.01) |
| C04B 24/16 | (2006.01) |
| C04B 24/24 | (2006.01) |
| C04B 24/38 | (2006.01) |

(52) U.S. Cl.
CPC ............. *C04B 28/10* (2013.01); *C04B 14/28* (2013.01); *C04B 20/008* (2013.01); *C04B 24/08* (2013.01); *C04B 24/16* (2013.01); *C04B 24/24* (2013.01); *C04B 24/38* (2013.01); *C04B 24/383* (2013.01); *C04B 28/02* (2013.01); *Y02W 30/97* (2015.05)

(58) Field of Classification Search
CPC ..... C04B 28/10; C04B 28/023; C04B 20/008; C04B 14/28; C04B 24/08; C04B 24/16; C04B 24/24; C04B 24/38; C04B 24/383; Y02W 30/97

USPC ............................................................ 524/5
See application file for complete search history.

(56) References Cited

U.S. PATENT DOCUMENTS

| 6,913,644 B2 * | 7/2005 | Rizza .................... C04B 18/248 |
| | | 106/730 |
| 2014/0121303 A1 * | 5/2014 | Hagen ..................... C04B 20/10 |
| | | 524/5 |

FOREIGN PATENT DOCUMENTS

| AT | EP 1336595 A2 * | 8/2003 | ............. C04B 28/34 |
| DE | WO 2008034616 A1 * | 3/2008 | ........... C04B 22/064 |
| DE | EP 2404885 A2 * | 1/2012 | ............. C04B 28/10 |
| EP | 1336595 A2 | 8/2003 | |
| EP | 2263985 A1 | 12/2012 | |
| EP | 2724996 A2 | 4/2014 | |
| EP | 2014/076344 | 12/2014 | |
| FR | EP 2263985 A1 * | 12/2010 | ............. C04B 28/10 |
| FR | WO 2014001712 A1 * | 1/2014 | ............. C04B 28/02 |
| FR | EP 2724996 A2 * | 4/2014 | ............. C04B 28/02 |
| JP | 3760559 B2 | 11/1998 | |
| JP | 3760559 B2 * | 3/2006 | ............. C04B 28/02 |
| WO | 2014001712 A1 | 1/2014 | |

OTHER PUBLICATIONS

Ferraris et al. "Particle Size and Surface Area by Laser Diffraction", National Cooperative Highway Research Program, Apr. 30, 2013, pp. 1-A12, URL:http://onlinepubs.trb.org/onlinepubs/nchrp/nchrp_rrd_382.pdf [retrieved on Oct. 9, 2014].*
"Fiche Technique: ARGIGEM Addition Pouzzolanique", Argeco Development, Oct. 1, 2012 (Oct. 1, 2012), pp. 1-2, XP55170459, retrieved from Internet [retrieved on Feb. 18, 2015].*
J. Oates "Lime and Limestone: Chemistry and Technology, Production and Uses", 1988, pp. 218-223, 258, 259, 267, XP002735206, ISBN: 978-3-527-29527-2.*

* cited by examiner

*Primary Examiner* — Michael M Bernshteyn
(74) *Attorney, Agent, or Firm* — Whitaker Chalk Swindle & Schwartz PLLC; Charles Gunter

(57) ABSTRACT

A system based on plant or bio-sourced materials selected from among coatings, mortars and concretes of bio-sourced materials comprising a plant or bio-sourced material selected from the group consisting of wood and hemp, and a binder composition comprising a first conventional mineral component and a second component, said system being characterized in that said binder composition has a specific surface area calculated according to the BET method, greater than 10 $m^2/g$, preferably greater than 12 $m^2/g$, in particular greater than 14 $m^2/g$ and uses thereof.

16 Claims, No Drawings

SYSTEM OF PLANT OR BIO-SOURCED MATERIALS

BACKGROUND OF THE INVENTION

1. Field of the Invention

The present invention relates to a system based on plant or bio-sourced materials selected from coatings, mortars and concretes of bio-sourced materials comprising a plant or bio-sourced material selected from the group consisting of wood and hemp, and a binder composition comprising a first conventional mineral component and a second component.

2. Description of the Prior Art

By the term of <<mortar>>, is meant in the sense of the present invention a mixture of one or several mineral binders like lime, cement or the like, optionally associated with one or several organic binders, and of aggregate(s). In the case of <<lightweight>> mortar with plant or bio-sourced aggregates, the aggregates are of the hemp, wood type or the like. Such a mortar is used in building for binding and/or for covering the building elements and may also contain fillers, additives and/or adjuvants.

By the term of <<coating>>, is meant a mortar composition intended to be applied as a layer in one or several passes. A coating is therefore a mortar for application on outdoor surfaces (render) or on indoor surfaces (plaster).

By the terms of <<lightweight concrete>> in the sense of the present invention, is mainly meant a lightweight mortar, used for bulk application (blocks, cast . . . ).

Mortars, concretes and lightweight coatings with plant or bio-sourced aggregates are already well known to one skilled in the art. As an example, mention may be made of document EP1406849 which describes compositions for the technical sector of concretes and so called hemp mortars, i.e. containing hemp shive or hurd, either defibrated or not and/or other components of hemp, such as fibers, fibrils, dusts, powders of hemp.

By the term of hemp in the sense of the present invention, is meant that the bio-sourced material comprises at least one component stemming from hemp, and/or from flax, and/or from miscanthus, and/or from sunflower and/or from cereal straw, like oat husk or rice husk, and/or generally any comparable hydrophilic material, including optionally synthetic material.

The binders used in this kind of compositions are commonly gypsum, air lime, formulated lime or hydraulic lime, cements and other hydraulic and pozzolanic binders like meta-kaolin, slags from blast furnaces or fly ash.

These building products based on hemp or wood have a major advantage in terms of thermal and acoustic isolation as well as in terms of mechanical strength notably as regards resistance to compression and return of elasticity, which makes them very good products adapted to seismic standards.

However, these compositions of concretes and mortars pose a very serious problem because of the strongly hydrophilic nature of the plant or bio-sourced aggregate. Indeed, as the latter is capable of absorbing a very large amount of water, up to about 400% of its weight (of water or of a water-based liquid), it often tends to absorb the water contained in the mortar or concrete and required for solidification of these systems, notably when the binder used is with hydraulic setting. These concretes and mortars consequently require often the use of a more substantial amount of water and/or have random characteristics of drying, of setting, and of mechanical properties.

According to document EP 1 406 849, the drawbacks of these concretes and hemp mortars have been partly solved by using a particular binder totally or partly consisting of air lime optionally in diverse combinations of types and forms of lime and including at least one adjuvant for forming pores and very thin capillaries and at least one hydrophobicization adjuvant.

However, the thereby obtained hemp mortars/concretes always have serious defects, such as the lack of drying and other analogue defects (lack of setting, flouring, . . . ), such that a large portion of the relevant industry, in spite of all its efforts, has not managed to overcome and was therefore forced to tolerate this.

Moreover, concretes based on plant or bio-sourced aggregates suffer from instability of application performances, related to the undesirable interactions of the mineral binder with the extractible and degradation products of the organic aggregate, notably having the consequence of delaying, or even inhibiting the setting of the conventionally used mineral binder.

These interactions vary with the chemical composition and the physico-chemical properties of the plant aggregate, which depend on the variety, the origin, the weather conditions, the cultivation and the transformation of the plant, therefore on variable and unpredictable factors.

SUMMARY OF THE INVENTION

The present invention aims at solving the aforementioned problems, in particular at inhibiting the undesirable interactions of the mineral binders, conventionally used in lightweight mortars, concretes and coatings with plant or bio-sourced aggregates, with the extractible and degradation products of the organic aggregate.

In order to solve this problem, provision is made according to the invention for a system based on plant or bio-sourced materials as indicated initially which is characterized in that said binder composition has a specific surface area calculated according to the BET method of more than 10 $m^2/g$, preferably greater than 12 $m^2/g$, in particular greater than 14 $m^2/g$.

The specific surface area according to present invention is measured by nitrogen adsorption manometry and calculated according to the BET method, after degassing in vacuo at 190° C. for at least 2 hours.

It is important not to confuse the BET specific surface area, measured by adsorption or desorption of nitrogen after degassing, with the Blaine specific surface area, measured by permeability to air. Indeed, the BET method gives the possibility of determining the totality of the specific surface area of a compound, notably taking into account its porosity, and is not directly dependent on the size of the constitutive particles, whereas the Blaine method allows exclusive determination of the external surface area of the particles of this compound and directly depends on the size of the latter. (Allan T., Particle Size Measurement, Vol. 2, Surface area and pore size determination, fifth edition, 1997, page 11, page 39).

In order to obtain such a specific surface area of the binder composition of the system based on plant or bio-sourced materials according to present invention, it is advantageously provided that the second component has a specific surface area calculated according to the BET method greater than 22 $m^2/g$, preferably greater than 25 $m^2/g$ and preferably selected from the group consisting of slaked lime, colloidal clays, in particular kaolinites, bentonite or wollastonites, zeolites and ultra-fine silicas and mixtures thereof.

DETAILED DESCRIPTION OF THE INVENTION

The increase in the specific surface area of the binder composition of the system based on plant or bio-sourced materials according to present invention has a major advantage lying in its interaction with organic molecules, stemming both from the additives typically used in the binders and mortars and from extractible and degradation products of the wood and plant fibers. If it is desired that the organic additives may keep their action on the mortar, coating or concrete system based on plant or bio-sourced aggregates according to the present invention, the extraction or decomposition products of the plant or bio-sourced material as for them are rather detrimental for said system. It is therefore advantageous to be able to inhibit the effects of the latter.

In a particularly advantageous embodiment, at least one from among said first conventional mineral component and said second component is based on powdery slaked lime.

Preferably, said second component is based on powdery slaked lime.

In particular, said second component is based on powdery slaked lime having a specific surface area calculated according to the BET method, greater than 22 $m^2/g$.

The slaked lime consists of a set of solid particles, mainly calcium di-hydroxide of formula $Ca(OH)_2$, and is the industrial result of slaking quick lime with water, a reaction also called a hydration. This product is also known under the name of hydrated lime or air lime and typically has BET surface areas of less than 20 $m^2/g$ (J. A. H. Oates, *Lime and Limestone-Chemistry and Technology, Production and Uses*, 1998, p. 220).

This slaked or hydrated lime or air lime or calcium hydroxide may of course contain impurities, i.e., phases derived from $SiO_2$, $Al_2O_3$, $Fe_2O_3$, MnO, $P_2O_5$, $K_2O$ and/or $SO_3$, globally representing a few tens of grams per kilogram. Nevertheless, the sum of these impurities, expressed as the aforementioned oxides, does not exceed 5% by mass, preferably 3%, preferably 2% or even 1% of the mass of the slaked lime according to the invention. In particular, the slaked lime advantageously contains less than 1.5% by mass of $Fe_2O_3$, preferably less than 1% and preferably less than 0.5%.

This slaked lime may further contain magnesium oxide or hydroxide. Depending on the contents of these compounds, this will be referred to as magnesium, dolomitic or dolomite lime, partly or totally slaked.

This slaked lime may also contain calcium oxide which would not have been hydrated during the slaking, just as it may contain calcium carbonate $CaCO_3$ or magnesium carbonate $MgCO_3$. These carbonates may either stem from the initial limestone (or from crude dolomite) from which is derived the slaked lime according to the invention (unburnt), or from a partial carbonation reaction of slaked lime in contact with air. The calcium oxide content in the slaked lime within the scope of the present invention is generally less than 3% by mass, preferably less than 2% and advantageously less than 1%. The content of carbonates is less than 20% by mass, in particular less than 10% by mass, preferably less than 6% and advantageously less than 4%, still more advantageously less than 3%.

According to present invention, the selection of a second component with a high specific surface area, i.e. greater than or equal to 22 $m^2/g$, preferably greater than 25 $m^2/g$, as a second component of said binder composition of the system according to the invention by means of powdery slaked lime with a high specific surface area or by adding a component of the colloidal clay type, in particular kaolinites, bentonite or wollastonites or zeolites with a high specific surface area or further ultrathin silicas and mixtures thereof, surprisingly allowed reduction in the detrimental impact of the extraction or decomposition products of the plant or bio-sourced material without altering the global operation of the lightweight mortar, concrete or coating in particular resulting therefrom, by preserving the action of the aforementioned organic additives in said system. This phenomenon is all the less predictable since if these organic molecules are adsorbed on the second component, nothing suggests that the action of the organic additives and/or the action of the second component will be preserved.

The presence of the second component with a high specific surface area in the binder composition of the system based on plant or bio-sourced materials according to the invention gives the possibility, during the use in a mortar, coating or concrete based on plant or bio-sourced aggregates, of reducing, or even suppressing the inhibition of the hydraulic setting of the first mineral component (in particular a first conventional mineral binder), a setting which is consequently less delayed. Further, the setting in air of the mortar, coating or concrete based on plant or bio-sourced aggregates is promoted. This leads to a more resistant mortar, coating or concrete. Further, reducing the amount of binder (and consequently the cost of the system) may then be contemplated with iso-performances. Also, the flouring phenomenon is reduced or even annihilated.

Advantageously, said second component of the system based on plant or bio-sourced materials has a specific surface area calculated according to the BET method, greater than 27 $m^2/g$, preferably greater than 30 $m^2/g$, preferentially, greater than 32 $m^2/g$ and in particular greater than 35 $m^2/g$, and is preferably selected from the group consisting of slaked lime, colloidal clays, in particular kaolinites, bentonite or wollastonites, zeolites and ultrafine silicas and mixtures thereof. More particularly powdered slaked lime (either alone or as a mixture) will more particularly be preferred, having the specific surface area mentioned above.

In a particular embodiment, said first conventional mineral component is a binder component selected from the group consisting of cements, standard slaked or air lime, of natural or artificial hydraulic lime, of clays, of binders for masonry, of binders with pozzolanic and hydraulic setting, gypsum and mixtures thereof.

Preferably, said cements are selected from the group of common cements, notably standardized, for example gray or white, refractory, molten aluminous prompt cements, Portland cements, slags from blast furnaces, fly ash and mixtures thereof.

Preferably, said second component is present in an amount of more than 6% by weight, advantageously more than 10% by weight, preferentially more than 20% by weight, in particular equal to or more than 25% by weight, preferably equal to or more than 30% by weight, advantageously equal to or more than 40% by weight and equal to or less than 80% by weight, in particular equal to or less than 60% by weight, based on the total weight of said binder composition of the system based on plant or bio-sourced materials.

More particularly, said second component has particles having a $d_3$ of more than 0.1 µm, in particular more than 0.5 µm and a $d_{98}$ of less than or equal to 200 µm, in particular less than or equal to 150 µm, measured by grain size measurement with a laser in methanol.

The notation $d_X$ represents a diameter expressed in µm, with respect to which X % of the measured particles or grains are smaller.

In a particular embodiment according to the present invention, said second component has particles having, a $d_{98}$ of less than or equal to 90 μm, most particularly less than or equal to 63 μm.

In a preferential embodiment according to the present invention, said second component has a total pore volume calculated according to the BJH method of nitrogen desorption greater than or equal to 0.07 cm$^3$/g, preferably greater than or equal to 0.08 cm$^3$/g, preferentially greater than or equal to 0.1 cm$^3$/g.

In a particular embodiment according to the present invention, said second component has a total pore volume calculated according to the BJH method of nitrogen desorption, greater than or equal to 0.12 cm$^3$/g, preferably greater than or equal to 0.15 cm$^3$/g and particularly greater than 0.18 cm$^3$/g.

By <<total pore volume>> in the sense of the present invention, is meant the total volume of the pores for which the size is comprised between 17 and 1,000 Å (1.7 and 100 nm), as measured by nitrogen adsorption manometry and calculated according to the BJH method, after degassing in vacuo at 190° C. for at least 2 hours. In particular, said second component is based on powdery slaked lime and has a bulk density measured according to the EN 459-2 standard ranging from 250 to 500 kg/m$^3$.

Preferentially, the system based on plant or bio-sourced materials according to present invention further comprises an air entrainer such as a surfactant or tenside, in particular selected from the group of alkyl sulfates and sulfonates, ethoxylated fatty alcohols, block copolymers and mixtures thereof.

In an alternative according to the invention, the system based on plant or bio-sourced materials may further comprise one or several water retaining agents, for example cellulose ethers or guar gums, derivatives thereof and mixtures thereof.

In still another alternative according to the present invention, the system based on plant or bio-sourced materials further comprises a rheology modifier, in particular selected from the group of hydrocolloids, more particularly from the group of polysaccharides, starch derivatives, alginates, guar gums and derivatives thereof, xanthan gums and derivatives thereof, carrageenan gums and derivatives thereof, succinoglycans, superplasticizers like polycarboxylates and melamine formaldehydes, mineral colloids, in particular silica and clays, and mixtures thereof.

Advantageously, the system based on plant or bio-sourced materials according to the invention also comprises a hydrophobicizing agent selected from the group of salts of fatty acids such as stearates and oleates, plant and mineral oils, silanes, siloxanes and mixtures thereof.

In a particular alternative, the system based on plant or bio-sourced materials according to present invention further comprises an organic binder selected from the group of industrial latices such as for example latices based on polyvinyl acetate/ethylene, polyvinyl acetate/versatate, styrene/butadiene copolymers.

In a preferential embodiment according to the present invention, the system based on plant or bio-sourced materials as mentioned above is in a dry form, ready to be mixed with water.

In an alternative according to the present invention, the system based on plant or bio-sourced materials further comprises water and is thus in a ready-to-use form.

It is understood that the system according to the invention may either be provided as a pre-formulated composition or as two components to be mixed on site according to a predetermined procedure.

Other embodiments of the system based on plant or bio-sourced materials for lightweight mortars, concretes and coatings with plant or bio-sourced aggregates, more particularly for hemp concrete according to the invention are indicated in the appended claims.

The invention also relates to a use of the system based on plant or bio-sourced materials according to present invention, in a mortar containing plant or bio-sourced aggregates like wood or hemp.

The invention also relates to a use of the system based on plant or bio-sourced materials according to the present invention in a lightweight coating containing plant or bio-sourced aggregates like wood or hemp.

The present invention also relates to a use of the system based on plant or bio-sourced materials according to the invention in a concrete containing plant or bio-sourced aggregates like wood or hemp.

Advantageously, said plant or bio-sourced aggregates have the shape of straw with a length from 5 to 50 mm and a width of less than 10 mm.

Other embodiments of use of the system based on plant or bio-sourced materials according to the invention are mentioned in the appended claims.

Other features, details and advantages of the invention will become apparent from the description given hereafter, as non-limiting and referring to the examples.

EXAMPLES

Example 1

A binder composition for hemp concrete according to the invention consists (by mass) of 42% of diverse slaked limes (standard air lime STD, slaked lime with a larger specific surface area HS or slaked lime of a smaller specific surface area BS) as a second component according to Table 1 below, 42% of CEM I 52.5 Portland cement as a first mineral component, and 16% of limestone filler <300 μm. Organic additives customarily used in mortars (air entrainers, water retainers, rheological additives, hydrophobicizers) are further added in a weight proportion from 0 to 2% based on the total weight of said binder composition. Notably, the binder composition comprises 0.2% by weight of air entrainer. The grain size of the slaked limes is measured in methanol by means of a laser granulometer.

TABLE 1

| Second component | BET surface area (m$^2$/g) of the second component | BET surface area (m$^2$/g) of the binder composition | $d_3$ (μm) | $d_{10}$ (μm) | $d_{25}$ (μm) | $d_{50}$ (μm) | $d_{75}$ (μm) | $d_{90}$ (μm) | $d_{97}$ (μm) |
|---|---|---|---|---|---|---|---|---|---|
| Lime BS3 | 6.7 | 3.6 | 0.8 | 1.4 | 3.3 | 11.7 | 38.3 | 75.5 | 132.0 |
| Lime STD4 | 14.6 | 6.9 | 0.7 | 1.2 | 2.0 | 3.6 | 6.2 | 9.8 | 34.9 |
| Lime HS2 | 35.8 | 15.8 | 0.8 | 1.2 | 2.0 | 4.2 | 10.0 | 27.3 | 50.7 |
| Lime HS3 | 31.7 | 14.1 | 0.8 | 1.3 | 2.1 | 3.8 | 6.7 | 12.8 | 36.2 |

A hemp concrete is then prepared by using 9.6 kg of these formulated binders, with 4.15 kg of hemp hurd 1, of commercial quality. The water level (Water/Solid, W/S) is adjusted so as to obtain the same consistency of fresh concrete. Samples with a cylindrical shape (h=22 cm, d=11 cm) are then prepared in specimens. More specifically, concrete layers each compressed with a pressure of about 0.006 MPa, are successively stacked on each other in said specimens. After their preparation, the specimens are stored in a climatic chamber at 20° C. and 65% of humidity.

Uniaxial compression tests between 2 parallel plates (displacement of 5 mm/min) were conducted on these samples after 14 and 28 days of storage, followed by 3 days of drying at 40° C. The resistances to compression (Rc) are mentioned in Table 2 (average over 6 measurements).

TABLE 2

| Concrete based on | W/S (%) | Rc 14 d (MPa) | Rc 28 d (MPa) |
| --- | --- | --- | --- |
| Lime BS3 | 76 | 0.03 ± 0.01 | 0.03 ± 0.01 |
| Lime STD4 | 79 | 0.10 ± 0.01 | 0.20 ± 0.01 |
| Lime HS2 | 81 | 0.28 ± 0.01 | 0.27 ± 0.01 |
| Lime HS3 | 84 | 0.28 ± 0.01 | 0.29 ± 0.01 |

As this may be seen, the concretes based on limes HS2 and HS3 have an increased mechanical strength, due to the high specific surface area of the lime used as a second component in the binder composition of the system according to the invention, as well as faster development of compression strength.

Example 2

A binder composition for hemp concrete according to the invention consists (by mass) of 42% of diverse slaked limes (standard STD air lime, slaked lime of larger specific surface area HS or slaked lime of smaller specific surface area BS) as a second component according to table 3 below, 42% of CEM I 52.5 Portland cement as a first mineral component, and 16% of limestone filler <300 μm. Organic additives customarily used in mortars (air entrainers, water retaining agents, rheological additives, hydrophobicizers) are further added in a weight proportion from 0 to 2% based on the total weight of said binder composition. The grain size of the slaked limes is measured by means of a laser granulometer in methanol.

TABLE 3

| Second component | BET surface area ($m^2/g$) of the second component | $d_3$ (μm) | $d_{10}$ (μm) | $d_{25}$ (μm) | $d_{50}$ (μm) | $d_{75}$ (μm) | $d_{90}$ (μm) | $d_{97}$ (μm) |
| --- | --- | --- | --- | --- | --- | --- | --- | --- |
| Lime BS4 | 6.9 | 1.1 | 3.1 | 13.5 | 54.2 | 102.8 | 156.7 | 225.3 |
| Lime STD5 | 13.5 | 0.7 | 1.3 | 2.5 | 5.0 | 8.3 | 12.9 | 32.2 |
| Lime HS4 | 39.6 | 0.9 | 1.3 | 2.2 | 4.3 | 9.7 | 27.5 | 51.3 |

A hemp concrete is prepared by using, in mass proportions, 9.3 kg of the formulated binders, with 4.15 kg of hemp hurd 2, of commercial quality, this second hemp hurd being known for inducing flouring of the standard concrete on site. Samples with a cylindrical shape of the thereby conformed concrete are prepared like in Example 1.

Compression tests (displacement of 5 mm/min) were conducted on these samples after 28 days of storage, followed by 3 days of drying at 40° C. The compression resistances (Rc) are mentioned in table 4.

TABLE 4

| Concrete based on | W/S (%) | Rc 28 d (MPa) |
| --- | --- | --- |
| Lime BS4 | 77 | 0.01 ± 0.01 |
| Lime STD5 | 77 | 0.01 ± 0.01 |
| Lime HS4 | 81 | 0.21 ± 0.01 |

In concretes based on standard lime (lime STD5) and on low specific surface area lime (BS4), all the prepared samples were not able to be tested because some of them had broken upon their removal from the mold.

In specimens based on binder with the standard lime and the low specific surface area lime, a layer of yellow/browny appearance ("crust") is also observed, which is typically observed in samples of chalked hemp concrete.

Further, in both of these concretes, very low compression resistances were observed.

Only the binder based on high specific surface area lime (HS4) gives the possibility of attaining a significant mechanical strength level.

Example 3

A binder composition for hemp concrete according to the invention consists (by mass) of 42% of minerals with high specific surface area (standard lime STD, lime with high specific surface area HS, bentonite, pyrogenated <<Aerosil 200>> silica) or of a mixture thereof as a second component according to table 5 below, 42% of CEM I 52.5 Portland cement as a first mineral component, and 16% of limestone filler <300 μm. Organic additives customarily used in mortars (air entrainers, water retaining agents, rheological additives, hydrophobicizers) are further added in a weight proportion from 0 to 2% based on the weight of said binder composition.

TABLE 5

| Second component | Lime STD6 (%) | Lime HS5 (%) | Bentonite (%) | Aerosil 200 (%) | BET surface area of the second component ($m^2/g$) | BJH pore volume of the second component ($cm^3/g$) | BET surface area of the binder composition ($m^2/g$) | BJH pore volume of the binder composition ($cm^3/g$) |
|---|---|---|---|---|---|---|---|---|
| Lime STD6 | 100 | | | | 12.6 | 0.06 | 5.6 | 0.03 |
| Lime HS5 | | 100 | | | 43.8 | 0.20 | 18.1 | 0.09 |
| Component A | 50 | | 50 | | 44.2 | 0.08 | 12.2 | 0.04 |
| Component B | 84 | | | 16 | 44.0 | 0.16 | 15.5 | 0.06 |

A hemp concrete is then prepared by using in mass proportions, 6.7 kg of these formulated binders, with 3.0 kg of hemp hurd 2, known for inducing flouring of the standard concrete on site (see Example 2). Cylindrical-shaped samples of the thereby conformed concrete are prepared like in Examples 1 and 2.

Compression tests (displacement of 5 mm/min) were conducted on these samples after 14 and 28 days of storage, followed here by 7 days of drying at 40° C. The compression resistances (Rc) are mentioned in Table 6.

TABLE 6

| Concrete based on | W/S (%) | $R_c$ 14 d (MPa) | $R_c$ 28 d (MPa) |
|---|---|---|---|
| Lime STD6 | 73.0 | 0.01 ± 0.01 | 0.01 ± 0.01 |
| Lime HS5 | 76.1 | 0.31 ± 0.05 | 0.30 ± 0.02 |
| Component A | 72.0 | 0.06 ± 0.01 | 0.09 ± 0.01 |
| Component B | 70.0 | 0.18 ± 0.02 | 0.19 ± 0.02 |

In concretes based on standard lime (lime STD6), all the prepared samples were not able to be tested since some of them broke during their removal from the mold. In these specimens, very low compression resistances were observed.

The binder compositions based on high specific surface area components (lime HS5, component A and component B) give the possibility of attaining a significant level of mechanical strength. Moreover, the greater the specific surface area of the binder composition, the higher is the resistance and therefore the development of this resistance is delayed.

It is quite understood that the present invention is by no means limited to the embodiments described above and that many modifications may be made thereto without departing from the scope of the appended claims.

The invention claimed is:

1. A system based on plant or bio-sourced materials selected from coatings, mortars and concretes of bio-sourced materials comprising a plant or bio-sourced material selected from the group consisting of wood and hemp, and a binder composition comprising a first mineral component and a second component;
    wherein said binder composition has a specific surface area calculated according to the BET method, greater than 10 $m^2/g$;
    said second component is selected from the group consisting of slaked lime having a specific surface area, calculated according to the BET method, greater than 22 $m^2/g$,
    and kaolinites, bentonite and wollastonites and mixtures thereof;
    wherein said first mineral component is a binder component selected from the group consisting of cements, slaked lime, standard air lime, natural and artificial hydraulic lime, clays, binders for masonry, binders with pozzolanic and hydraulic setting, gypsum and mixtures thereof; and
    wherein at least one from among said first mineral component and said second component is based on powdery slaked lime.

2. The system based on plant or bio-sourced materials according to claim 1, wherein said second component has a specific surface area calculated according to the BET method, greater than 25 $m^2/g$.

3. The system based on plant or bio-sourced materials according to claim 1, wherein said second component has a specific surface area calculated according to the BET method, greater than 27 $m^2/g$.

4. The system based on plant or bio-sourced materials according to claim 1, wherein said cement is a common cement.

5. The system based on plant or bio-sourced materials according to claim 1, wherein said second component is present in an amount of more than 5% by weight and equal or less than 80% by weight, based on the total weight of said binder composition.

6. The system based on plant or bio-sourced materials according to claim 1, wherein said second component has a total pore volume calculated according to the BJH method with nitrogen desorption greater than or equal to 0.07 $cm^3/g$.

7. The system based on plant or bio-sourced materials according to claim 1, wherein said second component has a total pore volume calculated according to the BJH method with nitrogen desorption greater than or equal to 0.12 $cm^3/g$.

8. The system based on plant or bio-sourced materials according to claim 1, wherein said second component is based on powdery slaked lime.

9. The system based on plant or bio-sourced materials according to claim 1, wherein said second component is based on powdery slaked lime and has a bulk density measured according to the EN 459-2 standard ranging from 250 to 500 $kg/m^3$.

10. The system based on plant or bio-sourced materials according to claim 1, further comprising an air entrainer.

11. The system based on plant or bio-sourced materials according to claim 1, further comprising a water retaining agent selected from the group consisting of cellulose ethers, guar gums, derivatives thereof and mixtures thereof.

12. The system based on plant or bio-sourced materials according to claim 1, further comprising a rheology modifier.

13. The system based on plant or bio-sourced materials according to claim 1, further comprising a hydrophobicizing agent selected from the group consisting of salts of fatty acids, plant and mineral oils, silanes, siloxanes and mixtures thereof.

14. The system based on plant or bio-sourced materials according to claim 1, further comprising an organic binder comprising an industrial lattice selected from the group consisting of lattices based on polyvinyl acetate/ethylene, based on polyvinyl acetate/versatate, and based on styrene/butadiene copolymers.

15. The system based on plant or bio-sourced materials according to claim 1, characterized in that it is in a dry form.

16. The system based on plant or bio-sourced materials according to claim 1, further comprising water.

* * * * *